US011022562B2

(12) United States Patent
Ferdous (10) Patent No.: US 11,022,562 B2
(45) Date of Patent: Jun. 1, 2021

(54) METHODS AND SYSTEMS FOR VISION SYSTEM ASSISTED INSPECTIONS (71) Applicant: Illinois Tool Works Inc., Glenview, IL (US)

(72) Inventor: Sakif Bin Ferdous, Skokie, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 4 days.

(21) Appl. No.: 16/384,544

(22) Filed: Apr. 15, 2019

(65) Prior Publication Data
US 2020/0326287 A1 Oct. 15, 2020

(51) Int. Cl.
  G01N 21/91 (2006.01)
  G01N 21/88 (2006.01)
(52) U.S. Cl.
  CPC ......... *G01N 21/91* (2013.01); *G01N 21/8851* (2013.01)
(58) Field of Classification Search
  CPC ........ G06K 9/4652; G06K 9/00; G01N 21/91; G06T 7/001; G06T 2207/10116
  USPC .......................................... 382/131, 141, 154
  See application file for complete search history.

(56) References Cited

U.S. PATENT DOCUMENTS

| 4,528,455 A * | 7/1985 | Loose | ................... G01N 21/88 250/559.16 |
| 10,510,141 B2 * | 12/2019 | Wang | ................... G01N 21/00 |
| 2005/0259861 A1 * | 11/2005 | Nomoto | ............... G06K 9/4652 382/141 |
| 2008/0094616 A1 * | 4/2008 | Tanaka | ............... G01N 21/8803 356/237.2 |
| 2010/0220910 A1 * | 9/2010 | Kaucic | ................... G06T 7/001 382/131 |
| 2012/0303333 A1 * | 11/2012 | Stuke | ..................... G01B 11/02 703/1 |
| 2017/0312821 A1 * | 11/2017 | DeFelice | ................. B23P 15/00 |
| 2018/0217099 A1 * | 8/2018 | Lepage | .............. G01N 27/9046 |
| 2019/0156472 A1 * | 5/2019 | Link | ..................... G06T 3/0006 |

FOREIGN PATENT DOCUMENTS

| JP | 2018100917 | 6/2018 |
| WO | 20120122542 | 9/2012 |
| WO | 20170221024 | 12/2017 |

OTHER PUBLICATIONS

International Search Report and Written Opinion for PCT/US2020/020259, dated Jun. 2, 2020, 15 pages.

* cited by examiner

*Primary Examiner* — Congvan Tran
(74) *Attorney, Agent, or Firm* — McAndrews, Held & Malloy, Ltd.

(57) ABSTRACT

Systems and methods are provided for vision system assisted inspections. An non-destructive testing (NDT) based setup may be configured for supporting use of visual scanner, which obtain visual scan of articles during NDT inspections. Scanning data corresponding to the visual scan may be processed, based on the processing, inspection indications may be identified, with each inspection indication corresponds to a possible defect in the article.

18 Claims, 4 Drawing Sheets

METHODS AND SYSTEMS FOR VISION SYSTEM ASSISTED INSPECTIONS

BACKGROUND

Non-destructive testing (NDT) is used to evaluate properties and/or characteristics of material, components, and/or systems without causing damage or altering the tested item. Because non-destructive testing does not permanently alter the article being inspected, it is a highly valuable technique, allowing for savings in cost and/or time when used for product evaluation, troubleshooting, and research. Frequently used non-destructive testing methods include magnetic-particle inspections, eddy-current testing, liquid (or dye) penetrant inspection, radiographic inspection, ultrasonic testing, and visual testing. Non-destructive testing (NDT) is commonly used in such fields as mechanical engineering, petroleum engineering, electrical engineering, systems engineering, aeronautical engineering, medicine, art, and the like.

In some instances, dedicated material and/or products may be used in non-destructive testing. For example, non-destructive testing of particular type of articles may entail applying (e.g., by spraying on, pouring into, passing through, etc.), to the would-be tested article or part, a material that is configured for performing the non-destructive testing. In this regard, such material (referred to hereinafter as "NDT material" or "NDT product") may be selected and/or made based on having particular characteristics (e.g., magnetic, visual, etc.) suitable for the non-destructive testing, such as by allowing detection of defects, irregularities, and/or imperfections (referred to collectively hereinafter as "defects") in the inspected article, based on the characteristics for which the NDT material is selected.

In many instances, the NDT based inspections are conducted visually—that is, where the detection of defects is done by visually inspecting the inspected articles. As noted above, in some instances, the application of NDT material may help with the visual inspections, such as by making the defects more easily detected based on the particular characteristics of NDT material. For example, the defects may be visually identified based on, e.g., color contrast or some light-related behavior. Ambient light may be used in such visual inspections—that is, the operators may simply visually inspect the article in a well-lit area, such as after application of the NDT material. Alternatively or additionally, in some instances, a light source (e.g., special lamp) may be used within the system or setup being used to conduct the NDT inspection. In this regard, such light source may be used to provide light that meets particular criteria for conducting the inspections. Visual NDT inspections have some challenges and limitations, however.

Further limitations and disadvantages of conventional approaches will become apparent to one management of skill in the art, through comparison of such approaches with some aspects of the present method and system set forth in the remainder of this disclosure with reference to the drawings.

BRIEF SUMMARY

Aspects of the present disclosure relate to product testing and inspection. More specifically, various implementations in accordance with the present disclosure are directed to methods and systems for vision system assisted inspections, substantially as illustrated by or described in connection with at least one of the figures, and as set forth more completely in the claims.

These and other advantages, aspects and novel features of the present disclosure, as well as details of an illustrated implementation thereof, will be more fully understood from the following description and drawings.

DETAILED DESCRIPTION

Various implementations in accordance with the present disclosure are directed to providing enhanced and optimized visual non-destructive testing (NDT) inspections, particularly by implementing and operating non-destructive testing (NDT) based setups with visual systems or equipment. In this regard, as noted above, in some instances NDT inspections may be conducted visually, using ambient light and/or a specialized light-source, typically in combination with NDT related material applied to the to-be-inspected articles to render defects more easily identifiable. For example, the defects may be visually identified based on exhibiting certain unique and identifiable characteristics, such as based on color contrast or some light-related behavior. Visual NDT inspections have their own unique set of challenges and/or limitations, however. For example, some defects may be hard to visually identify by the operator, something that existing solutions may fail to account for or remedy. Therefore, NDT related setups or systems that overcome at least some of these shortcomings may be desirable.

Accordingly, implementations in accordance with the present disclosure address such issues and shortcomings, such as by providing non-destructive testing (NDT) based setups that allow for enhanced visual detections of defects. This may be done, for example, by incorporating use of vision systems or equipment, which may be configured for assisting operators to better identify defects during visual NDT inspections.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein, an "inspection component" includes any component of a machine or an setup configured for performing or facilitating non-destructive testing (NDT) inspection of articles. For example, an "inspection component" may include any one of: a structure or frame element of the machine or the apparatus as a whole and/or the setup where the inspection is performed, a holder component configured to hold the article being inspected (and to position it in a particular manner for conducting the inspection), a magnetization component configured for magnetizing the article being inspected (in magnetization based inspection), an application component configured for applying non-destructive testing (NDT) material to the article (e.g., in penetrant based inspection), a light source configured to emit light during the inspection, and the like. The inspection components may be obtained from different sources (e.g., different providers), and may be combined together when constructing an inspection machine or setup.

An example non-destructive testing (NDT) apparatus in accordance with the present disclosure may include one or more inspection components configured for performing non-destructive testing (NDT) inspection of an article; a visual scanner configured for obtaining a visual scan of the article during the non-destructive testing (NDT) inspection; and one or more circuits configured to process scanning data corresponding to the visual scan of the article, and identify based on the processing, one or more inspection indications in the article, with each inspection indication corresponding to a possible defect in the article.

In an example implementation, the one or more circuits are configured to store preprogramed control data for use in identifying and/or assessing inspection indications.

In an example implementation, the one or more circuits are configured to generate control data for use in identifying and/or assessing inspection indications.

In an example implementation, the one or more circuits are configured to generate the control data based on a learning algorithm that is configured for adding or adjusting information relating to identification of one or more particular defects in each of one or more different articles, and/or information relating to assessing each particular defect. In an example implementation, the one or more circuits are configured for progressively added or adjusting the identification related information.

In an example implementation, the learning algorithm is configured based on pattern recognition, and the one or more circuits may be configured for generating pattern recognition based control data for each of the one or more different articles.

In an example implementation, the one or more circuits are configured to assess each one of the one more inspection indications based on acceptance criteria data associated with the article, wherein the acceptance criteria data defines when each possible defect is acceptable or not; and for at least one inspection identification that is deemed unacceptable, generate a notification for alerting an operator of the system In an example implementation, the one or more circuits are configured to generate indication related data relating to at least one of the one more inspection indications. The indication related data may relate to one or more of: location associated with the inspection indication, a type of the inspection indication, and one or more characteristics of a corresponding defect.

In an example implementation, the non-destructive testing (NDT) apparatus may comprise a feedback component configured to provide feedback to an operator of the system during the non-destructive testing (NDT) inspection.

In an example implementation, the feedback component comprises a visual output device.

In an example implementation, the feedback component comprises an audible output device.

In an example implementation, the one or more circuits are configured to provide via the feedback component alerts relating to at least one of the one more inspection indications.

In an example implementation, the one or more circuits are configured to generate or adjust the alerts based on a type of the feedback component and/or a type of output supported in the feedback component.

In an example implementation, the visual scanner comprises a camera.

In an example implementation, the one or more inspection components are configured for performing lighting-based liquid penetrant inspection (LPI).

In an example implementation, the one or more inspection components are configured for performing lighting-based magnetic particle inspection (MPI).

In an example implementation, the one or more inspection components comprise, when configured for magnetic non-destructive testing (NDT) based inspections a current generator that generates an electrical current; and one or more electrical contacts configured to apply the electrical current to the article during the non-destructive testing (NDT) inspection, wherein the application of the electric current creates a magnetic field in the inspection article.

Figure 1A:
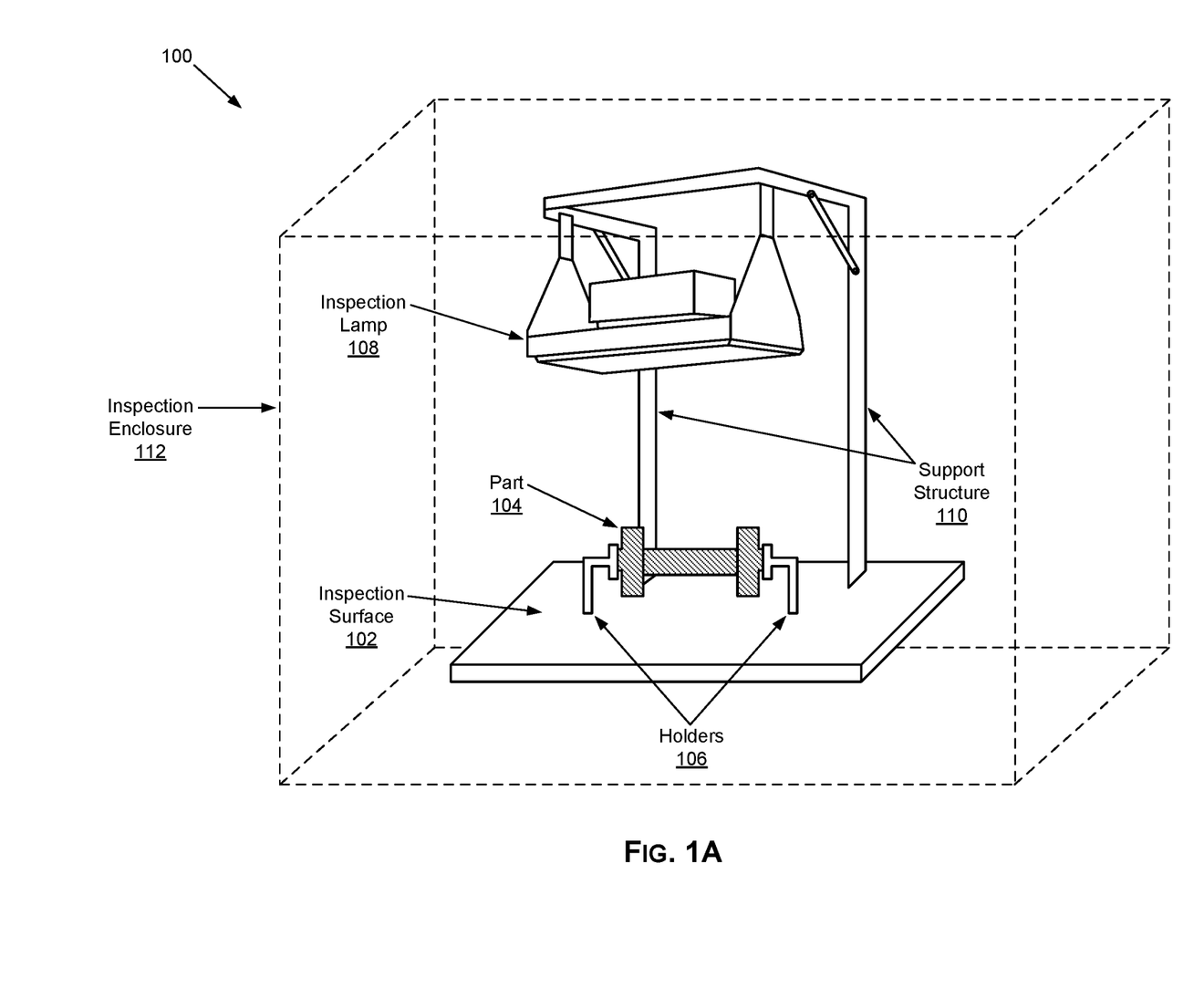
FIG. 1A illustrates an example light-source based non-destructive testing (NDT) inspection setup that may be used for use in visual inspections, which may be configured for operation in accordance with the present disclosure.

FIG. 1A illustrates an example light-source based non-destructive testing (NDT) inspection setup that may be used for use in visual inspections, which may be configured for operation in accordance with the present disclosure. Shown in FIG. 1A is an NDT setup 100 which may be used in performing visual NDT inspections.

The NDT setup 100 may comprise various components configured for non-destructive testing (NDT) inspection of articles (e.g., machine parts and the like), in accordance with particular NDT inspection methodology and/or technique. In this regard, various NDT inspections techniques may be used. Two example techniques are "magnetic particle inspection" (MPI) technique and the "liquid penetrant inspection" (LPI) technique, with the MPI technique typically being used with ferrous material, and the LPI technique typically being used with non-ferrous material (e.g., aluminum, brass, etc.) Accordingly, in various implementations the NDT setup 100 may be configured for performing MPI based inspections and/or LPI based inspections.

With either technique, the goal is to make defects detectable when the article is inspected. The inspection and accordingly the detection of defects may be done visually—that is, using visual inspection of the inspected articles. Thus, the NDT setup 100 may be configured for visual NDT inspections. In this regard, in visual NDT inspections, defects in inspected articles may be detected visually, particularly by use of light—e.g., ambient light or light projected on the inspected articles. The NDT setup 100 may be specifically for use a light source, however. In this regard, in some instances, visual NDT inspections may require use of a specially designed light source (e.g., a lamp), which may be configured to emit light in particular manner. In this regard, the emitted light may be white light, a light of other type (e.g., ultraviolet (UV) light), or any combination thereof. In some instances, visual NDT inspections may entail use of NDT related material, which is applied to the to-be-inspected articles. In this regard, defects may be visually identified based on, for example, color contrast or another light-related behavior, which may be caused or enhanced by the applied NDT related material.

As shown in FIG. 1A, the NDT setup 100 comprises a light source 108 (e.g., a lamp), which may be designed and/or configured for use in non-destructive testing (NDT) inspection of articles—that is, where light emitted by the lamp 108 is used during the NDT inspections, either by providing suitable ambient lighting environment or by being projected on the articles. The lamp 108 may be attached to a support structure 110 such that it may project light downward onto an inspection surface 102, upon which an article (e.g., a machine part) 104 may be placed, being secured in particular position such as using holders 106, so that it may be inspected using the light emitted and/or projected by the lamp 108.

In some instances, NDT setups (e.g., the NDT setup 100) may be configured for special lighting criteria or conditions. For example, NDT setup 100 may be configured for use of ultraviolet (UV) light to conduct NDT inspections, alone or in combination with white (or visible) light. Thus, the lamp 108 may be configured for generating and/or projecting ultraviolet (UV) light. In some instances, the lamp 108 may also emit white (or visible) light. Alternatively, if needed, ambient white light (or other white light sources) may be used. The lamp 108 may be any suitable light source. In some instance, the lamp 108 may be implemented in accordance with any of the implementation described in U.S. patent application Ser. No. 16/049,567, filed on Jul. 30, 2018, and entitled "Broad-Beam Ultraviolet (UV) Inspection Lamp For Use In Non-Destructive Testing (NDT)."

In some instances, NDT setups (e.g., the NDT setup 100) may incorporate special measures for enhancing performance (e.g., improve ability to detect defects), particularly with respect to lighting conditions. For example, as shown in FIG. 1A, the NDT setup 100 may be configured for use of an inspection enclosure 112. In this regard, the inspection enclosure 112 may be used to a suitable lighting environment for the inspection, such as by blocking or otherwise limit ambient light. This may be done to ensure that most of the light within the NDT setup 108 is that originating from the lamp 108, thus allowing controlled lighting environment for the inspections. The inspection enclosure 112 may be configured, for example, as a tent-like structure or any other structure that provide sufficient shading. Further, the inspection enclosure 112 may be adjustable—e.g., based on the user's preferences, surrounding space, etc.

The NDT setup 100 may also incorporate a controller unit (not shown) to allow operators to control the NDT setup 100 and/or inspections performed therein. In this regard, such controller unit may comprise suitable circuitry and input/output components, as described in more detail below.

The NDT setup 100 may be used to perform NDT inspections, particularly visual NDT inspection, as described above. However, as noted above, visual NDT inspections may be have some shortcomings and/or limitation. In this regard, because visual inspections are effectively based on visual identification of defects by the operator, errors may be made based on failure to identify defects or for mistakenly identifying something as defect when it is not (i.e., "false negative").

Accordingly, in various implementations in accordance with the present disclosure, visual NDT inspections may be enhanced by incorporating measures for enhance the accuracy or reliability of visual NDT inspections, and/or for providing suitable actions related to visual detection of defects, such as to notify the user, to take corrective measures, etc.

In some example implementations, this may be achieved by incorporating vision systems or equipment within into the NDT setup. In this regard, the vision systems or equipment may be configured for assisting operators in detecting defects, to ensure that all actual defects are detected and/or to prevent detection of any false negatives. Such vision systems or equipment may be fixed (e.g., built-in to some of the existing components in the NDT setup) and/or moveable, to allow the user some flexibility in determining where to place them within the NDT setup, such as based on the user preferences, unique characteristics associated with the inspections (e.g., the particular article being inspected), etc. Use of such vision systems or equipment is described in more detail below, with respect to FIG. 2.

Figure 1B:
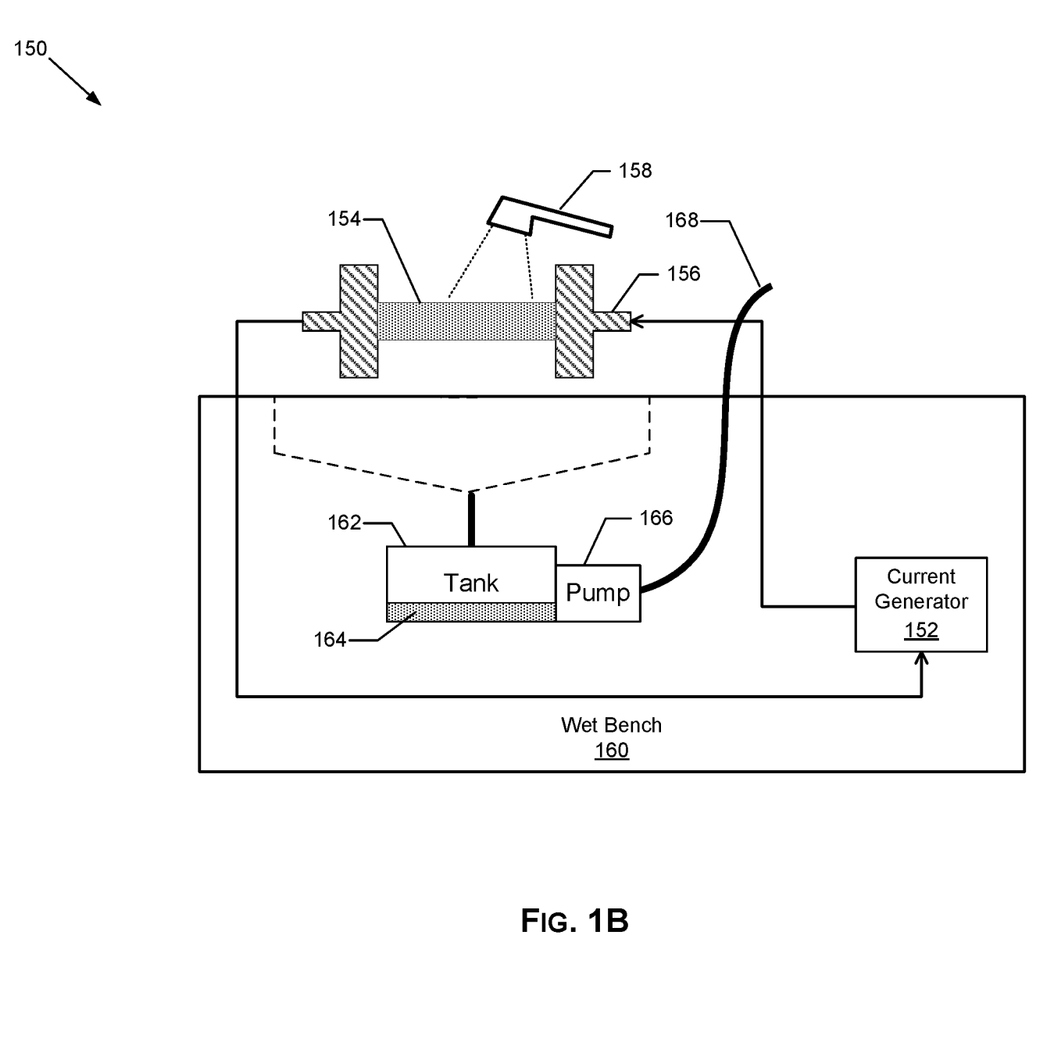
FIG. 1B illustrates an example wet bench based non-destructive testing (NDT) inspection setup that may be used for use in visual inspections, which may be configured for operation in accordance with the present disclosure.

FIG. 1B illustrates an example wet bench based non-destructive testing (NDT) inspection setup that may be used for use in visual inspections, which may be configured for operation in accordance with the present disclosure. Shown in FIG. 1B is an NDT setup 150 which may be used in performing visual NDT inspections.

The NDT setup 150 may comprise various components configured for non-destructive testing (NDT) inspection of articles (e.g., machine parts and the like), in accordance with particular NDT inspection methodology and/or techniques. In this regard, as noted above, various NDT inspections techniques may be used, including the "magnetic particle inspection" (MPI) technique, which is typically used with ferrous material, and the "liquid penetrant inspection" (LPI) technique, which is typically being used with non-ferrous material (e.g., aluminum, brass, etc.). Accordingly, in various implementations the NDT setup 150 may be configured for performing MPI based inspections or LPI based inspections.

With either technique, the goal is to make defects detectable when the article is inspected, which in the NDT setup 150 may be achieved by application of an NDT material to the inspect articles. In this regard, the NDT setup 150 may comprise a wet bench based setup that is configured for NDT inspections in which the inspected articles are "bathed" using an NDT material—that is, the NDT material is applied during the inspections (e.g., using a hose-based system) to the inspected articles, to facilitate the detection of defects in the articles. The application of the NDT material in that manner may enable, for example, detecting defects (e.g., visually) based on particular exhibited behavior or characteristics in response to the application of the NDT material, and (optionally) another trigger—e.g., magnetization for articles composed of or comprising ferrous material. The magnetization may be achieved, for example, by application of electrical current through the article, magnetic induction (e.g., using handheld magnetization equipment), etc.

For example, the NDT setup 150 may be configured for magnetic particle based inspections. In this regard, as shown in the example implementation illustrated in FIG. 1B, the NDT setup 150 may include a wet bench 160, comprising a tank 162 that stores an NDT solution 164, which may be applied onto inspected articles (e.g., the article 154 as shown in FIG. 1B), via a pump 166 and a hose 168. The NDT setup 150 of FIG. 1B also includes a current generator 152 that applies electrical current(s) to a to-be inspected article (e.g., part) 154 via electrical contacts 156. In this regard, various magnetization approaches may be used, with some systems allowing for selecting among such options. The magnetization may be achieved using, for example, AC (alternating current), half wave DC (direct current), or full wave DC (direct current). In some systems, a demagnetization function may be built into the system. For example, the demagnetization function may utilize a coil and decaying AC (alternating current).

During inspection, the NDT material 164 (e.g., a wet magnetic particle solution) is applied to the part. The particle solution 164 (also called "bath") may comprise visible or fluorescent particles that may be magnetized. The particle solution 164 may be collected and held in the tank 162. The pump 166 pumps the bath through a hose 168 to apply the particle solution 164 to the part 154 being inspected (e.g., via a nozzle that is used in spraying the parts) and/or to collect samples of the particle solution 164 in a container 116 for contamination analysis.

The NDT setup 150 may also incorporate a controller unit (not shown) to allow operators to control the NDT setup 150 and/or inspections performed therein. In this regard, such controller unit may comprise suitable circuitry and input/output components, as described in more detail below.

In some instances, dedicated light sources may be incorporated into and/or used in conjunction with wet bench based NDT setups (e.g., NDT setup 150) when performing visual inspections.

The inspections performed using the NDT setup 150 may be done visually, as described above. In this regard, in some instances, dedicated light sources may be incorporated into and/or used in conjunction with wet bench based NDT setups (e.g., NDT setup 150) when performing visual inspections. As noted above, however, visual NDT inspections may be have some shortcomings and/or limitation. In this regard, because visual inspections are effectively based on visual identification of defects by the operator, errors may be made based on failure to identify defects or for mistakenly identifying something as defect when it is not (i.e., "false negative").

Accordingly, in various implementations in accordance with the present disclosure, visual NDT inspections may be enhanced by incorporating measures for enhance the accuracy or reliability of visual NDT inspections, and/or for providing suitable actions related to visual detection of defects, such as to notify the user, to take corrective measures, etc. This may be achieved, for example, by incorporating vision systems or equipment within into the NDT setup, as described above. Use of such vision systems or equipment is described in more detail below, with respect to FIG. 2.

Figure 2:
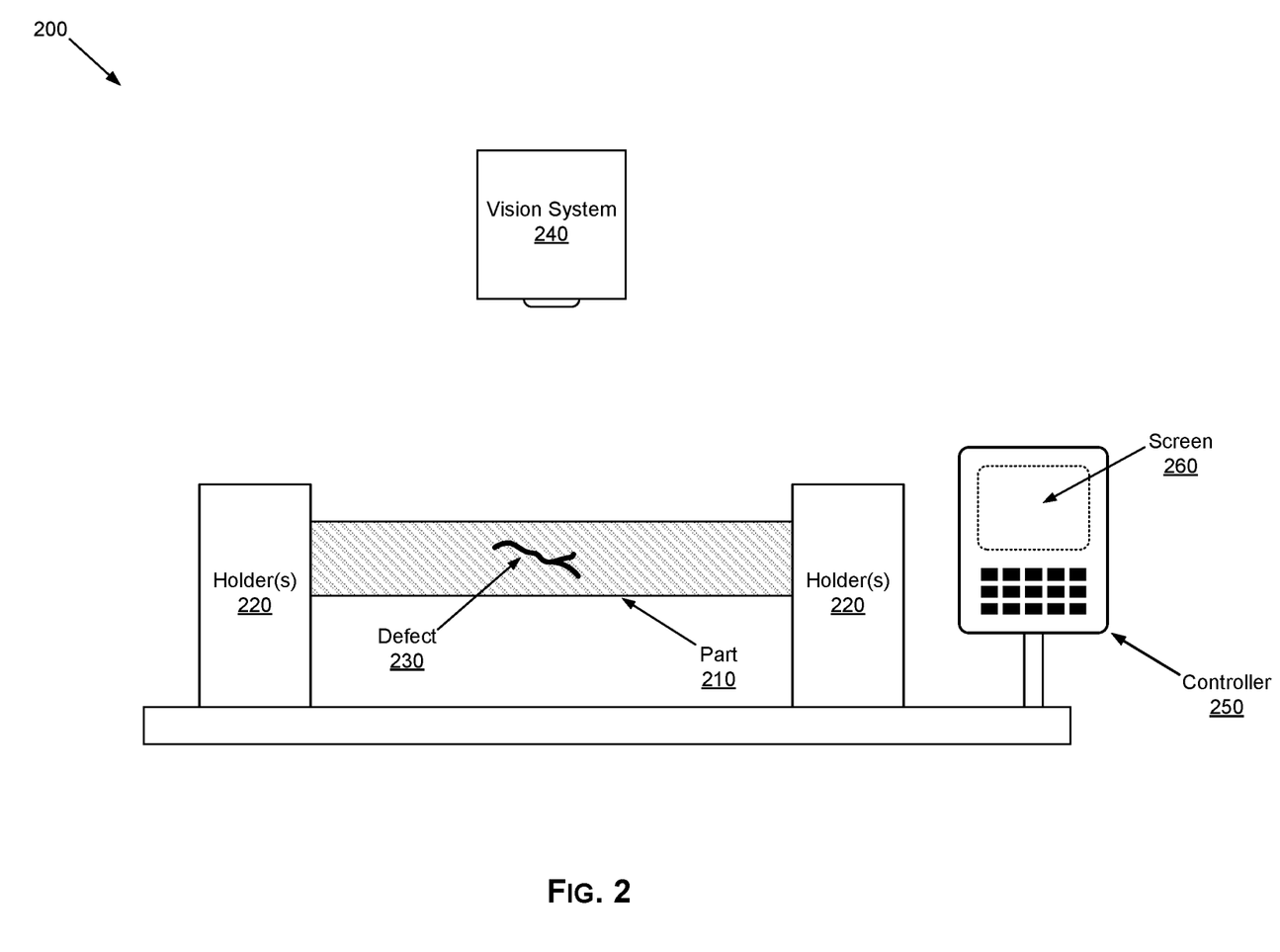
FIG. 2 illustrates an example visual non-destructive testing (NDT) inspection setup with vision system for assisted inspections, in accordance with the present disclosure.

FIG. 2 illustrates an example visual non-destructive testing (NDT) inspection setup with vision system for assisted inspections, in accordance with the present disclosure. Shown in FIG. 2 is an NDT setup 200 which may be used in performing visual NDT inspections.

The NDT setup 200 may comprise various components configured for visual non-destructive testing (NDT) inspections, as described above. In this regard, the NDT setup 200 may correspond to an implementation of the NDT setup 100 as described with respect to FIG. 1A, or the NDT setup 150 as described with respect to FIG. 1B.

The NDT setup 200 may configured, however, for enhancing and/or optimizing performance during visual NDT inspections, such as by incorporating use of dedicated vision equipment configured for enhanced detection of defects—e.g., assisting the user in correctly identifying defects in inspected articles, (optionally) taking or triggering additional actions for ensuring enhanced detection, such as providing related feedback to the user, taking autonomous corrective measures, etc. In this regard, as explained above, conventional approaches for performing visual inspections in NDT setups may suffer from reliability and accuracy related issues, particularly with respect to missed defects and/or false negatives. This may be due to issues relating with lighting conditions, issues with the setup, operator errors (e.g., due to lack of familiarity with particular articles and/or expected behavior corresponding to defects).

For example, as shown in the example implementation illustrated in FIG. 2, the NDT setup 200 may incorporate a vision system 240, which may be used to assist the user when conducting visual NDT inspections, such as when inspecting a particular article 210 (e.g., a machine part). In this regard, the article 210 may be placed in particular manner—e.g., being secured in a particular position such as using holders 220, so that it may be inspected in accordance with particular technique. For example, while not shown in FIG. 2, the NDT setup 200 may be configured for magnetic particle based inspection, such as using bathing technique (e.g., the NDT setup 200 being wet bench based setup). Similarly, while not shown in FIG. 2, a light source (e.g., lamp) may be used, to project light meeting certain criteria on article 210.

The vision system 240 may comprise suitable hardware (including circuitry) for obtaining a visual scan of the article being inspected during the inspection, and for generating corresponding scanning data. For example, vision system 240 may comprise a camera that is configured to obtain still pictures or video of the inspected article during the inspection, and as such the scanning data may comprise pictorial or video data. Once obtained, the scanning data may be processed, such as to obtain information pertinent to identification of defect, and/or for enhancing reliability and performance of visual inspection.

For example, the processing of the scanning data may be configured to enable identifying particular indications of possible defects (e.g., defect 230 as shown in FIG. 2) in the inspected article, such as based on particular identification criteria. In this regard, each indication may correspond to an area on the inspected article exhibiting particular characteristics (e.g., particular color or variation thereof) that may be indicative of a defect in that area. The identified indications may then be assessed, to determine whether they correspond to actual defects (or to defects that are unacceptable). In this regard, each indication may be assessed based on acceptance criteria associated with the particular article being inspected. The acceptance criteria may define, for example, when each possible defect is acceptable or not, such as by defining applicable thresholds for what constitute defects based on which the article may be rejected (or otherwise deemed unacceptable). In this regard, different identification criteria and/or the acceptance criteria may be defined, such as for different articles (e.g., different types of articles, different parts, different products, etc.) and/or for different operators (e.g., different preferences).

The NDT setup 200 may be configured for setting or adjusting the identification criteria and/or the acceptance criteria based on control data. In this regard, the control data may comprise preprogramed control data which, which may be stored within the NDT setup 200 (e.g., in the vision system 240 itself, or in another component). In some instances, the control data may be generated or adjusted, such as based on inspections performed in the setup (e.g., based on performed inspections). For example, at least some of the control data may be generated based on a learning algorithm that is configured for adding or adjusting information relating to identification of particular defects in one or more different articles, and/or information relating to assessing each identified defect. In this regard, the identification related information may be added or adjusting progressively. The learning algorithm may be configured based on pattern recognition, for example, with control data being generated differently based on pattern recognition for each of one or more different articles.

In some instances, indication related data may be generated for at least some of the indications. The indication related data may be generated for all detected identifications. Alternatively, the indication related data may be generated only in some scenarios—e.g., only for particular identifications, only for particular identified defects, and/or in response to determining that particular indication(s) correspond to identification of unacceptable defect(s). The indication related data may include information relate to one or more of: location associated with the indication, a type of the indication, and one or more characteristics of a corresponding defect.

The NDT setup 200 may be configured for performing particular actions based on the scanning data, and/or the processing thereof, with these actions being configured to enhance the visual NDT inspections. For example, the NDT setup 200 may be configured for generating and/or providing feedback to an operator of the system based on obtained scanning data, such under certain conditions—e.g., when certain indications are detected, when particular indications of defects are detected, and/or when particular defects are determined to be unacceptable, generate a notification for alerting an operator of the system. The feedback may comprise a simple notification or alert to the operator of the system. Alternatively or additionally (e.g., based on user request), more complex feedback may be generated and/or provided (e.g., based on generated indication related data). The feedback may be configured based on available output devices in the NDT setup. For example, the feedback may comprise visual feedback, which may be provided via suitable visual output devices (e.g., screen), audible feedback, which may be provided via suitable audible output device, etc.

In some implementations, the vision system 240 may be configured to communicate with at least one other component of the system. For example, the vision system 240 may be configured for supported wired and/or wireless connections. Accordingly, the vision system 240 may comprise suitable circuitry for facilitating such connections, and communications using these connections.

The vision system 240 may be configured to use available connections (wired and/or wireless) to, for example, communicate the scanning data and/or data obtained based on thereon (e.g., based on processing of the scanning data), for supporting or facilitating enhance visual NDT inspections in the NDT setup 200. For example, in some instances, at least some of the processing of the scanning data may be performed in components other than the vision system 240. Such component may be configured to handle such processing. In this regard, the component may comprise suitable circuitry for performing the necessary processing.

For example, as shown in FIG. 2, the NDT setup 200 may comprise a controller unit 250, which may comprise suitable circuitry for handling the processing of the scanning data, and/or for performing and/or controlling any actions taken based on the processing of the scanning data. The controller unit 250 may incorporate a screen or display 260, for example, which may be used to display information relating to any detected indications and/or corresponding identified defects (e.g., alerts and/or feedback data as described above). The disclosure is not so limited, however, and as such other combination or variations may be supported. For example, the "controller" may comprise an already included controller circuitry (e.g., controller circuitry for the lamp 210), which may be configured to performed some the required processing functions. Further, in some instances, at least some of the processing may be performed within at least one of the vision system 240. In such implementations, such lighting sensor may comprise suitable circuitry for handling the required processing.

The vision system 240 may be a "fixed" component. In this regard, the vision system 240 may be permanently fixed (e.g., attached to one of the other components) in the NDT setup 200, such as above an inspection surface or over the holders 220. In other implementations, however, the vision system 240 may be moveable and/or adjustable, to enable temporary placement and/or adjustment of position thereof within the NDT setup 200. For example, the vision system 240 may comprise an attachment element (e.g., clip-like component) to enable its attachment to certain points in the NDT setup 200. This may allow the user some flexibility in determining where and how to place and/or position the vision system 240 within the NDT setup 200, such as based on the user preferences (e.g., to ensure that the sensor would not interfere with the inspection), to optimize inspection (e.g., based on the article being inspected, inspection parameters, etc.), and the like.

In various example implementations, NDT setups incorporating and/or supporting use of vision systems may be configured to incorporate use of automation—e.g., automating various operations or functions pertaining to performing inspections in these setups, particularly in conjunction with use of vision systems in these setups. For example, NDT setups (e.g., the NDT setup 200) may be configured to utilize automated defect recognition, in conjunction with the vision related components (e.g., the vision system 240) and/or functions associate therewith. In this regard, with automated defect recognition, a visual scanner (e.g., the vision system 240) may search for indications of defects, and the indications are processed independent of the operator—e.g., by suitable processing circuitry in the NDT setup (e.g., directly within the visual scanner, or by another component comprising such suitable processing circuitry, such as the controller unit 250 in the NDT setup 200—in such instances, the visual scanner is configured to communicate the indications to the other component(s), using available wired and/or wireless connections.

For example, with automated defect recognition, the indications are processed to determine if they correspond to defects, and to determine whether based on any detected defects the part passes or fails inspection. A pass/fail outcome may then be automatically recorded, and the operator may be notified. For example, indications detected by the visual scanner (e.g., the vision system 240 in the NDT setup 240) may be compared via suitable processing circuitry against defect identification criteria. Further, the indications (or defects determined based thereon) may further be processed, such as to determine whether the defect(s) (or the part as a whole) meet particular acceptance criteria, and consequently whether the inspection results in fail or pass outcome. In this regard, one or both of the defect identification criteria and/or the acceptance criteria may be predefined and/or generated (e.g., based on using of learning algorithms).

In some implementations, NDT setups may be completely automated—that is, configured to support handling the inspection as a whole, including any use of vision systems, completely without an operator at all—e.g., using robotic part handling for handling the inspected article, and a vision system for detecting and assessing defects and/or determining whether the defects (or the part as a whole) meet or fail to meet applicable acceptance criteria.

Figure 3:
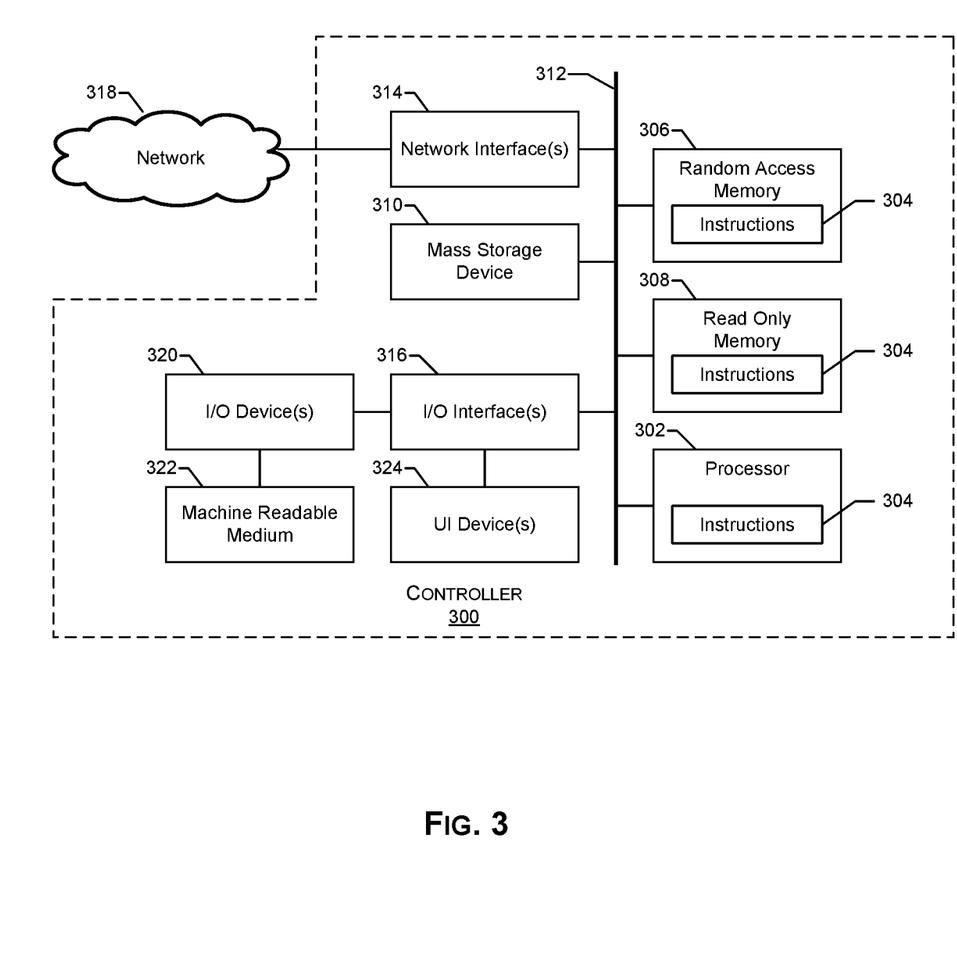
FIG. 3 illustrates an example controller for use in non-destructive testing (NDT) based setups incorporating use of inspection lamps with integrated light sensors, in accordance with aspects of the present disclosure.

FIG. 3 illustrates an example controller for use in non-destructive testing (NDT) based setups incorporating use of inspection lamps with integrated light sensors, in accordance with aspects of the present disclosure. Shown in FIG. 3 is a controller system 300.

The controller system 300 may comprise suitable circuitry for implementing various aspects of the present disclosure, particularly for use in providing controller related functions in NDT setups implemented in accordance with the present disclosure. In this regard, the controller system 300 may represent an example implementation of the controller unit 250 of FIG. 2. Accordingly, the control system 300 may be configured for supporting visual NDT inspections, particularly in setups incorporating inspections in setup that incorporate vision systems or equipment and use thereof, as described with respect to FIG. 2. For example, the control system 300 may be configured for performing at least some of the processing of the scanning information generated by the vision system or equipment, and for taking or supporting actions taken based thereon, as described with respect to the NDT setup 200.

As shown in FIG. 3, the controller system 300 may include a processor 302. In this regard, the example processor 302 may be any general purpose central processing unit (CPU) from any manufacturer. In some example implementations, however, the processor 302 may include one or more specialized processing units, such as RISC processors with an ARM core, graphic processing units, digital signal processors, and/or system-on-chips (SoC).

The processor 302 executes machine readable instructions 304 that may be stored locally at the processor (e.g., in an included cache or SoC), in a random access memory (RAM) 306 (or other volatile memory), in a read only memory (ROM) 308 (or other non-volatile memory such as FLASH memory), and/or in a mass storage device 310. The example mass storage device 310 may be a hard drive, a solid state storage drive, a hybrid drive, a RAID array, and/or any other mass data storage device.

A bus 312 enables communications between the processor 302, the RAM 306, the ROM 308, the mass storage device 310, a network interface 314, and/or an input/output (I/O) interface 316.

The example network interface 314 includes hardware, firmware, and/or software to connect the controller system 300 to a communications network 318 such as the Internet. For example, the network interface 314 may include IEEE 202.X-compliant wireless and/or wired communications hardware for transmitting and/or receiving communications.

The example I/O interface 316 of FIG. 3 includes hardware, firmware, and/or software to connect one or more user interface devices 320 to the processor 302 for providing input to the processor 302 and/or providing output from the processor 302. For example, the I/O interface 316 may include a graphics processing unit for interfacing with a display device, a universal serial bus port for interfacing with one or more USB-compliant devices, a FireWire, a field bus, and/or any other type of interface.

The example controller system 300 includes a user interface device 324 coupled to the I/O interface 316. The user interface device 324 may include one or more of a keyboard, a keypad, a physical button, a mouse, a trackball, a pointing device, a microphone, an audio speaker, an optical media drive, a multi-touch touch screen, a gesture recognition interface, and/or any other type or combination of types of input and/or output device(s). While the examples herein refer to a user interface device 324, these examples may include any number of input and/or output devices as a single user interface device 324. Other example I/O device(s) 320 an optical media drive, a magnetic media drive, peripheral devices (e.g., scanners, printers, etc.), and/or any other type of input and/or output device.

The example controller system 300 may access a non-transitory machine readable medium 322 via the I/O interface 316 and/or the I/O device(s) 320. Examples of the machine readable medium 322 of FIG. 3 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Other implementations in accordance with the present disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various implementations in accordance with the present disclosure may be realized in hardware, software, or a combination of hardware and software. The present disclosure may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various implementations in accordance with the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain implementations, it will be understood by those skilled in the art that various changes may be made and equivalents may be substituted without departing from the scope of the present disclosure. For example, block and/or components of disclosed examples may be combined, divided, re-arranged, and/or otherwise modified. In addition, many modifications may be made to adapt a particular situation or material to the teachings of the present disclosure without departing from its scope. Therefore, it is intended that the present disclosure not be limited to the particular implementation disclosed, but that the present disclosure will include all implementations falling within the scope of the appended claims.

What is claimed is:

1. A system for use in non-destructive testing (NDT), the system comprising:
    one or more inspection components configured to apply non-destructive testing (NDT) inspection of an article;
    a visual scanner configured to obtain a visual scan of the article during the non-destructive testing (NDT) inspection; and
    one or more circuits configured to:
        process scanning data corresponding to the visual scan of the article; and
        identify based on the processing of the scanning data and pre-defined identification criteria, one or more inspection indications in the article, wherein:
            the pre-defined identification criteria are based on exhibited characteristics indicative of defects, and
            each inspection indication corresponds to a possible defect in the article.

2. The system of claim 1, wherein the one or more circuits are configured to store preprogramed control data for use in identifying and/or assessing inspection indications.

3. The system of claim 1, wherein the one or more circuits are configured to generate control data for use in identifying and/or assessing inspection indications.

4. The system of claim 3, wherein the one or more circuits are configured to generate the control data based on a learning algorithm that is configured for adding or adjusting information relating to identification of one or more particular defects in each of one or more different articles, and/or information relating to assessing each particular defect.

5. The system of claim 4, wherein the learning algorithm is configured based on pattern recognition; and
    wherein the one or more circuits are configured for generating pattern recognition based control data for each of the one or more different articles.

6. The system of claim 1, wherein the one or more circuits are configured to assess each one of the one more inspection indications based on acceptance criteria data associated with the article, wherein the acceptance criteria data defines when each possible defect is acceptable or not.

7. The system of claim 1, wherein the one or more circuits are configured to generate for at least one inspection identification that is deemed unacceptable, a notification for alerting an operator of the system.

8. The system of claim 1, wherein the one or more circuits are configured to generate indication related data relating to at least one of the one more inspection indications.

9. The system of claim 8, wherein the indication related data relates to one or more of: location associated with the inspection indication, a type of the inspection indication, and one or more characteristics of a corresponding defect.

10. The system of claim 1, comprising a feedback component configured to provide feedback to an operator of the system during the non-destructive testing (NDT) inspection.

11. The system of claim 10, wherein the feedback component comprises a visual output device.

12. The system of claim 10, wherein the feedback component comprises an audible output device.

13. The system of claim 10, wherein the one or more circuits are configured to provide via the feedback component alerts relating to at least one of the one more inspection indications.

14. The system of claim 13, wherein the one or more circuits are configured to generate or adjust the alerts based on a type of the feedback component and/or a type of output supported in the feedback component.

15. The system of claim 1, wherein the visual scanner comprises a camera.

16. The system of claim 1, wherein the one or more inspection components are configured for performing liquid penetrant inspection (LPI).

17. The system of claim 1, wherein the one or more inspection components are configured for performing magnetic particle inspection (MPI).

18. The system of claim 1, wherein the one or more inspection components comprise, when configured for magnetic non-destructive testing (NDT) based inspections:
    a current generator that generates an electrical current; and
    one or more electrical contacts configured to apply the electrical current to the article during the non-destructive testing (NDT) inspection, wherein the application of the electric current creates a magnetic field in the inspection article.

* * * * *